United States Patent
Dmitriev

(10) Patent No.: US 7,313,661 B1
(45) Date of Patent: *Dec. 25, 2007

(54) TOOL FOR IDENTIFYING CAUSES OF MEMORY LEAKS

(75) Inventor: Mikhail A. Dmitriev, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 280 days.

This patent is subject to a terminal disclaimer.

(21) Appl. No.: 11/084,407

(22) Filed: Mar. 18, 2005

(51) Int. Cl.
*G06F 12/02* (2006.01)
(52) U.S. Cl. ...................... 711/159; 711/170
(58) Field of Classification Search ............... 711/170, 711/159; 707/206; 717/126, 128
See application file for complete search history.

(56) References Cited

U.S. PATENT DOCUMENTS

| | | | | |
|---|---|---|---|---|
| 5,920,876 A | * | 7/1999 | Ungar et al. ............... | 707/206 |
| 6,560,773 B1 | * | 5/2003 | Alexander et al. .......... | 717/128 |
| 6,658,652 B1 | * | 12/2003 | Alexander et al. .......... | 717/128 |
| 6,782,462 B2 | * | 8/2004 | Marion et al. ............... | 711/170 |
| 2002/0078077 A1 | * | 6/2002 | Baumann et al. ........... | 707/206 |
| 2004/0133895 A1 | * | 7/2004 | Dahlstedt et al. ........... | 719/310 |

\* cited by examiner

*Primary Examiner*—Matthew Kim
*Assistant Examiner*—Paul Schlie
(74) *Attorney, Agent, or Firm*—Martine Penilla & Gencarella, LLP

(57) ABSTRACT

A method for identifying memory leak causes is provided. The method initiates with tracking a number of allocations of objects during a time period. Potentially leaking objects are identified and object lifetime tracking instrumentation is injected into the code to track potentially leaking objects. Then, object lifetime logs are generated for each of the potentially leaking objects. A computer readable medium and a system are also provided.

22 Claims, 8 Drawing Sheets

| epoch | # of surviving objects |
|---|---|
| 1 | 1 |
| 2 | 2 |
| 3 | 1 |
| 4 | 3 |
| 5 | 2 |

| Surviving object ID | epoch |
|---|---|
| Object A | 1 |
| Object B | 2 |
| Object C | 2 |
| Object D | 3 |
| Object E | 4 |
| Object F | 4 |
| Object G | 4 |
| Object H | 5 |
| Object I | 5 |

| epoch | # of surviving objects |
|---|---|
| 1 | 1 |
| 2 | 1 |
| 3 | 1 |
| 4 | 2 |
| 5 | 2 |

| Surviving object ID | epoch |
|---|---|
| Object A | 1 |
| Object B | 2 |
| Object D | 3 |
| Object E | 4 |
| Object G | 4 |
| Object H | 5 |
| Object I | 5 |

| epoch | # of surviving objects |
|---|---|
| 1 | 3 |
| 2 | 2 |
| 4 | 1 |
| 5 | 2 |
| 6 | 5 |
| 8 | 2 |
| 9 | 1 |
| 11 | 3 |

| epoch | # of surviving objects |
|---|---|
| 20 | 10,000 |
| 21 | 10,000 |

|   | String<br>Line 1 | | Foo<br>Line 3 | | Foo<br>Line 5 | | Bar<br>Line 8 | |
|---|---|---|---|---|---|---|---|---|
|   | epoch | obj | epoch | obj | epoch | obj | epoch | obj |
|   | 9 | x | 7 | x | 9 | x | 7 | x |
|   | 10 | x | 10 | x | 10 | x | 9 | x |
|   | 11 | x | 11 | x | 11 | x | 10 | x |
|   |   |   |   |   |   |   | 11 | x |

114  115  116  117

1  x1 = new String
2
3  x2 = new Foo()
4
5  x3 = new Foo()
6
7
8  x4 = new Bar()
9
10 x5 = new Bar
11
12

Bar
Line 10

| epoch | obj |
|---|---|
| 1 | x |
| 2 | x |
| 3 | x |
| 4 | x |
| 5 | x |
| 6 | x |
| 7 | x |
| 8 | x |
| 9 | x |
| 10 | x |
| 11 | x |
| 12 | x |

TOOL FOR IDENTIFYING CAUSES OF MEMORY LEAKS

CROSS REFERENCE TO RELATED APPLICATIONS

This application is related to U.S. patent application Ser. No. 10/893,090 filed on Jul. 16, 2004, and entitled "METHOD FOR MONITORING HEAP FOR MEMORY LEAKS," and U.S. patent application Ser. No. 10/893,069 filed on Jul. 16, 2004, and entitled "METHOD FOR IDENTIFICATION OF OBJECTS CAUSING MEMORY LEAKS." These applications are herein incorporated by reference in their entirety for all purposes.

BACKGROUND OF THE INVENTION

Most of the programming languages/run time systems support dynamic memory allocation and reclamation. In object-oriented languages, memory can be reserved and released on a per-object basis, e.g., through object acclamation and reclamation. In some languages, for example, C++, freeing memory occupied by an object is done explicitly, by calling a special system function. In other object-oriented languages, e.g., Java, that feature so-called automatic memory management, memory occupied by objects that are not in use anymore is reclaimed automatically by a run time subsystem called a garbage collector. In Java, an object is considered unused and available for reclamation if it is not reachable directly or transitively from any object graph root. These roots (omitting some second order implementation specific details) are stack frames, i.e., object type local variables of currently executing methods, and object type static variables of currently loaded classes.

A memory leak in a program written on a language such as C++, with manual memory management, is a well-known problem that happens when a program does not explicitly free some objects or rough memory area that is previously reserved. If in the course of program execution, allocations without reclamation repeat over and over again, these allocations may ultimately exhaust all the available memory, causing the program to crash.

A language such as Java, that features automatic memory management, is in theory designed to avoid exactly this kind of a problem. Thus memory leaks in "C++ sense" are not possible in Java, since every object that is not reachable will sooner or later be automatically reclaimed. However, another kind of memory leaks is still possible in Java. Such leaks happen when some object remains reachable, but is not used anymore, i.e. the program does not read or write its data fields. For example, a program may allocate a temporary object, attach it to some permanent, automatically growable data structure (such as an instance of java.util.Vector), use this object for some time, and then (logically) discard it. However, the object remains attached to the permanent data structure, and, though not used, cannot be reclaimed by the GC. Over time, a large number of such unused objects can exhaust the memory available for the program, making the latter stop.

A more subtle kind of a memory leak is when some data structure is designed poorly, and keeps growing unlimited when it shouldn't. A classical example is a persistent object cache that is not flushed properly. Strictly speaking, objects in such a cache are not unused—the program can request any of them at any moment. However, if the cache does not take care of evicting some objects periodically, it may ultimately grow too large, again exhausting the memory available for the program.

In light of the foregoing, it is desirable to implement a scheme for a method to identify memory leaks occurring in an object-oriented program. More specifically, a programmer looking for a memory leak typically needs to (a) identify particular objects that are leaking, and (b) find out why they are leaking, i.e. what other objects reference the leaking one(s), and thus prevent them from being reclaimed by the garbage collector.

In U.S. patent application Ser. No. 10/893,069, a method that identifies particular objects that are leaking is provided. A tool that uses this method can "pinpoint" objects that are likely leaking, giving the programmer, for example, their addresses in memory, contents, locations in program where they have been allocated and so on.

However, problem (b) above is not addressed. Existing tools typically provide a partial solution to this problem through the so-called "heap dump" feature. One skilled in the art will appreciate that the contents of the entire object heap of the application in question can be dumped and analyzed through this feature. By analyzing a heap dump, the programmer can identify chains of references from garbage collector roots to leaking objects. This information is sometimes sufficient to determine the root cause of the leak.

In certain situations, however, knowing just what objects hold a leaking object in memory is still insufficient. This is typically the case when these other objects appear to be created and managed by some third-party libraries or other code, with which the programmer is unfamiliar. In that case knowing the types, contents, etc., of these objects responsible for a leak, may not be of much use to the programmer. What the programmer needs to understand is what actions (e.g., function calls) in the program resulted in a leaking object attached to certain data structures, which prevent it from being garbage collected. Described below is a method and system that implements a scheme to identify memory leaks occurring in an object-oriented program.

SUMMARY OF THE INVENTION

Broadly speaking, the present invention fills these needs by providing a scheme for identifying memory leaks. The present invention can be implemented in numerous ways, including as an apparatus, a system, a device, or a method. Several embodiments of the present invention are described below.

In one embodiment, a method for identifying memory leak causes is provided. The method initiates with tracking a number of allocations of objects during a time period. Potentially leaking objects are identified and object lifetime tracking instrumentation is injected into the code to track potentially leaking objects. Then, object lifetime logs are generated for each of the potentially leaking objects.

In another embodiment, a computer readable medium having program instructions for identifying memory leak causes is provided. The computer readable medium includes program instructions for tracking a number of allocations of objects during a time period and program instructions for identifying potentially leaking objects. Program instructions for injecting object lifetime tracking instrumentation to track potentially leaking objects are included. Program instructions for generating object lifetime logs for each of the potentially leaking objects are also provided.

In yet another embodiment, a system for identifying memory leaks for an object-oriented application is provided. The system includes a microprocessor configured to execute the object-oriented application and a memory in communication with the microprocessor. Memory leak identification logic configured to identify memory leaks is included. The memory leak identification logic includes logic for tracking a number of allocations of objects during a time period, logic for identifying potentially leaking objects, logic for injecting object lifetime tracking instrumentation to track potentially leaking objects, and logic for generating object lifetime logs for each of the potentially leaking objects.

Other aspects and advantages of the invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

FIGS. 3A and 3B represent the tables of FIGS. 2A and 2B, respectively, after an object reclamation event in accordance with one embodiment of the invention.

FIGS. 4A and 4B represent exemplary epoch/number of surviving object pairs captured in tables in accordance with one embodiment of the invention.

FIG. 4C illustrates an epoch/surviving generation pair table corresponding to line numbers of an application in accordance with one embodiment of the invention.

DETAILED DESCRIPTION

Figures 1, 2A, 2B:
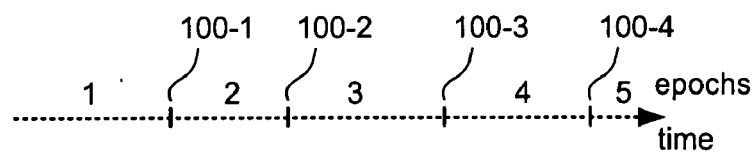
FIG. 1 is a simplified schematic diagram illustrating a run time for an application being divided into epochs in accordance with one embodiment of the invention.
FIGS. 2A and 2B represent exemplary data structures, e.g., tables, that may be used to capture object allocation data in accordance with one embodiment of the invention.

An invention is described for a system and method for evaluating whether an object-oriented program has memory leaks and identifying the cause of the memory leaks. It will be obvious, however, to one skilled in the art, that the present invention may be practiced without some or all of these specific details. In other instances, well known process operations have not been described in detail in order not to unnecessarily obscure the present invention.

The embodiments of the present invention provide a tool capable of collecting, processing, and presenting data that may be used to determine if a memory leak is occurring and the cause for the memory leak. In one embodiment, a profiling tool may be used to inject code into the application in order to provide a profile. One such profiling tool is discussed in application Ser. No. 10/783,863. The injected code then generates events when it gets executed. From these events, a system administrator is able to detect memory leaks and determine the cause of the memory leaks. Discussed below is a brief overview of the profiling tool that may be used in conjunction with the memory leak detection embodiments. Thereafter, an enhancement of the tool to identify the cause of the memory leak is discussed.

Application Ser. No. 10/893,069 describes a technique for identification of leaking objects based on tracking the allocation and garbage collection patterns for all objects in the running application. This technique identifies types and allocation sites for objects that are leaking. However, it does not give the user a real insight into the reasons why the leaking objects are being held in memory, i.e.

1. What data structure(s) reference the leaking objects; and
2. How leaking objects ended up attached to these structures.

Tools that provide features for memory leak debugging, for example OPTIMIZEIT from BORLAND, JPROBE from QUEST SOFTWARE, and JPROFILER from EJ TECHNOLOGIES, can provide answer to question 1 above by performing a so-called "heap dump" and then finding all chains of references that point to given objects. However, they don't provide an answer to question 2. Since the leaking object may end up attached to some obscure data structure defined, for example, deeply in the code of a third-party library, these tools are rendered useless for this function. Therefore, the user may have no clue about when/how this data structure was created, what it is used for, and how their object got attached to it.

Discussed below is how potentially leaking objects can be identified in an improved manner, as explained in U.S. patent application Ser. No. 10/893,069. Thereafter, according to the embodiments of this invention, a tool is provided to aid a user in identifying the reasons for such objects to leak.

According to the embodiments of U.S. patent application Ser. No. 10/893,069, each object allocation site, i.e. a location in the application's code where object allocation instruction(s) are located, is instrumented, so that every time an object is allocated, the information about this event is recorded. Instrumentation may be performed in either the source or the binary code, and in many possible ways. For example, a call to a special predefined function may be inserted just before or just after the call to the "new" operator, as in the following example (one skilled in the art will appreciate that while the code samples provided in this application are written in Java, the invention is not restricted to a Java programming language. That is, any suitable object-oriented programming language may utilize the profiling tool discussed herein):

// Original code
MyClass c = new MyClass( );
// Instrumented code
MyClass c = new MyClass( );
ProfilerClass.recordObjectAllocation("MyClass");

The recordObjectAllocation(className) method is called every time an object is allocated, and it records the fact that an object of the given type has been allocated by the application. Thus, it is possible to provide data about the number and types of allocated objects. This method may also sample the current stack contents, to obtain the full call path that leads to the given object allocation. Stack sampling can be performed differently depending on the programming language, environment, and platform used. It can be implemented as e.g. a low-level mechanism, written in assembly language, that traverses the physical stack for a given thread. For high-level languages such as Java, a special mechanism, such as the Java Virtual Machine Profiler Interface (JVMPI) Application Programming Interface (API) in the Java standard, may exist, that returns the contents of the stack corresponding to the Java program methods. The JVMPI is a two-way function call interface between the Java virtual machine and an in-process profiler agent.

The embodiments described herein provide a scheme that allows for easily distinguishing between leaking and non-leaking objects in most situations. Additionally, the scheme can identify where leaking objects are allocated, which in turn can assist in quickly identifying the root cause of the problem in order to correct the memory leaks. As most memory leaks develop as a gradual increase in the number of unused objects, the scheme described herein is well suited for the identification of these gradual increases. In one embodiment, the scheme requires support from the virtual machine or a run time system, on top of which a program in question runs. The system should be able to intercept object reclamation events for individual objects (also referred to as object garbage collection events) and garbage collection finish events (i.e. when a given garbage collection cycle is finished and the user application, that was suspended to make garbage collection possible, is ready to be resumed). Once the event is intercepted, the system should notify a user (or a special profiling/debugging tool) about this event. If a system can intercept object allocation events as well, it may also be useful (this can be used as an alternative to injected calls such as recordObjectAllocation( ) described above). It should be appreciated that support for interception of object reclamation events is available, for example, in modern Java virtual machines where it can be implemented either using weak references (instances of a special library class such as java.lang.ref.WeakReference standard library class). Alternatively, support for object reclamation may be available through special application program interfaces designed to be used by profiling and debugging tools, such as JVMPI and Java Virtual Machine Debug Interface (JVMDI).

As mentioned above, the embodiments described herein take advantage of the fact that a typical memory leak appears as a steadily growing group of objects of some type, which never gets reclaimed. One embodiment of this invention provides a way of distinguishing objects associated with memory leaks from other "healthy" groups of objects of the same type, that are either short-lived, i.e., reclaimed quickly, or long-lived but have been allocated once and do not grow in number any longer. In order to distinguish objects in these groups three kinds of events are tracked: object allocation, object reclamation, and garbage collection, i.e., a garbage collection finish event. The virtual manager or any other suitable run time system is enabled to intercept these events.

In another, low overhead embodiment, described further below, a system administrator is able to detect memory leaks in running applications without impacting application performance. The running application is written in an object-oriented language. For this embodiment to work, it is necessary that the VM or runtime system that executes the application features Mark and Compact, Copying, or other suitable garbage collector/object reclamation mechanism, that preserves the order in which objects have been allocated. Here again, the scheme exploits the fact that a memory leak demonstrates an object allocation/reclamation pattern where some objects remain alive after each garbage collection event. Thus, the age spread for these objects grows steadily, irrespective of the number of object changes. The object age is defined as the number of survived garbage collection events.

FIG. 1 is a simplified schematic diagram illustrating a run time for an application being divided into epochs in accordance with one embodiment of the invention. An epoch is a period of time between two sequential garbage collection finish events. Here, five epochs are displayed. That is, the dividers indicated by lines 100-1 through 100-4 define time periods, i.e., epochs, between the sequential garbage collection finish events. Thus, a first garbage collection event occurred during epoch 1, and ended at the time associated with line 100-1, and so on.

As illustrated further below, the object(s) allocated during a given epoch and surviving a garbage collection that ends this epoch, are referred to as a surviving generation. It should be further appreciated that the terms "garbage collection" and "object reclamation" are interchangeable as used herein. In the Figures described below, FIGS. 1-6 illustrate embodiments that detect a memory leak and provide information on the location of the memory leak. Further embodiments that do not add noticeable runtime overhead are discussed in more detail U.S. application Ser. No. 10/893,069.

FIGS. 2A and 2B represent exemplary data structures, e.g., tables, that may be used to capture object allocation data in accordance with one embodiment of the invention. Tables 102 and 104 are 2xn tables that are initially empty and configured as a growable array. It should be appreciated that either Tables 102 and 104, or both tables 102 and 104, may be hash tables. A line, or row, in Table 104 corresponds to a single surviving object. The line captures the unique object I.D. assigned to the surviving object and the number of the epoch when this object was allocated. A unique ID is assigned to the corresponding object by the profiling code when this object is allocated, and then a new line with this data is added to Table 104. The profiling code discussed above may be used here to assign the unique ID. Accordingly, "object A"-"object I" of Table 104 represent the assigned unique identifiers. When the object is reclaimed (garbage collected), the corresponding line is removed from Table 104.

In FIG. 2A, Table 102 captures the sequential epoch numbers and the number of surviving objects for each sequential epoch number. That is, each row of the table corresponds to a surviving generation of objects. Here, whenever an object is allocated and Table 104 is updated, Table 102 is checked if a line for the corresponding epoch exists. If a line for the corresponding epoch exists, then the number of objects in this line is incremented. If a line for the corresponding epoch does not exist, then a new line is created with the initial value equal to one. Whenever an object is reclaimed and Table 104 is updated accordingly, the counter in the corresponding epoch line of Table 102 is decremented. Thus, if the object associated with epoch 1 of Table 102 is reclaimed, the number of surviving objects associated with epoch 1 would be reduced by 1, resulting in 0. When the counter reaches zero, the table is compacted so that there are no lines in Table 102 with a number of objects equal to zero. It should be appreciated that the number of non-empty lines in Table 102 represents the number of surviving generations. That is, in Table 102 there are five surviving generations as there are five lines or rows. As the number of surviving generations increases, it is more likely that a memory leak is present.

FIGS. 3A and 3B represent the tables of FIGS. 2A and 2B, respectively, after an object reclamation event in accordance with one embodiment of the invention. Here, the objects associated with unique identifiers object C and object F have been reclaimed by the garbage collector. Thus, the third and fifth lines of Table 104 in FIG. 2B have been eliminated due to the reclamation of the corresponding objects. As mentioned above, object reclamation is performed by the garbage collector, when it finds that objects associated with unique identifiers C and F are no longer reachable, i.e., traceable to a root graph. Thus, in Table 108 the line entries for unique identifiers object C and object F have been deleted and Table 108 has been compacted. In turn, Table 106 of FIG. 3A is updated to reflect the reclamation of the objects associated with unique identifiers object C and object F. In particular, the line for epoch 2 and epoch 4 are decremented by one. It should be appreciated that once all objects that have been allocated in a particular epoch of Table 106 are reclaimed, the corresponding line will disappear, i.e., Table 106 will be compacted. That is, if the remaining surviving object for epoch 2 of Table 106 was reclaimed, then that line in Table 106 would disappear and the lines for epochs 3, 4, and 5 would move up in response to the empty line left from the reclamation of the remaining surviving object.

FIGS. 4A and 4B represent exemplary epoch/number of surviving object pairs captured in tables in accordance with one embodiment of the invention. In FIG. 4A, Table 110 illustrates a possible memory leak situation. As shown, the leaking objects prevent table compaction, so that after some number of garbage collections Table 110 results. Even though there are a small number of surviving objects, the long and growing number of surviving generations indicates a high probability of a slow memory leak in this case. On the other hand, Table 112 of FIG. 4B indicates a situation where a memory leak is likely not occurring. Here, there are a high number of surviving objects for two epochs, however, the number of surviving generations is very small—just two. Thus, in Table 110 of FIG. 4A the garbage collector is unable to eliminate a number of generations, thereby indicating a memory leak. In contrast, the objects associated with Table 112 are allocated and discarded quickly.

FIG. 4C illustrates several epoch/surviving generation pair tables, each of which corresponds to a particular line number of an application in accordance with one embodiment of the invention. That is, in this example the profiler associates a separate table with each location in the program where an object may be allocated (an allocation site). It should be appreciated that different granularity may be obtained based upon line numbers, functions, etc. That is, all object allocations that happen within a function, or a larger program module, can be aggregated into one table. In FIG. 4C the number of entries for Table 118 (this table corresponds to the object allocation operation in line 10), as compared to the number of entries for Table 114 through Table 117, indicates leaky behavior for Table 118. It should be appreciated that the value of x in the number of surviving objects columns may be any suitable integer greater than 0. Thus, a user would be alerted that the memory leak is associated with line 10 of the corresponding application. Of course, this implementation will be associated with a higher runtime overhead.

Figure 5:
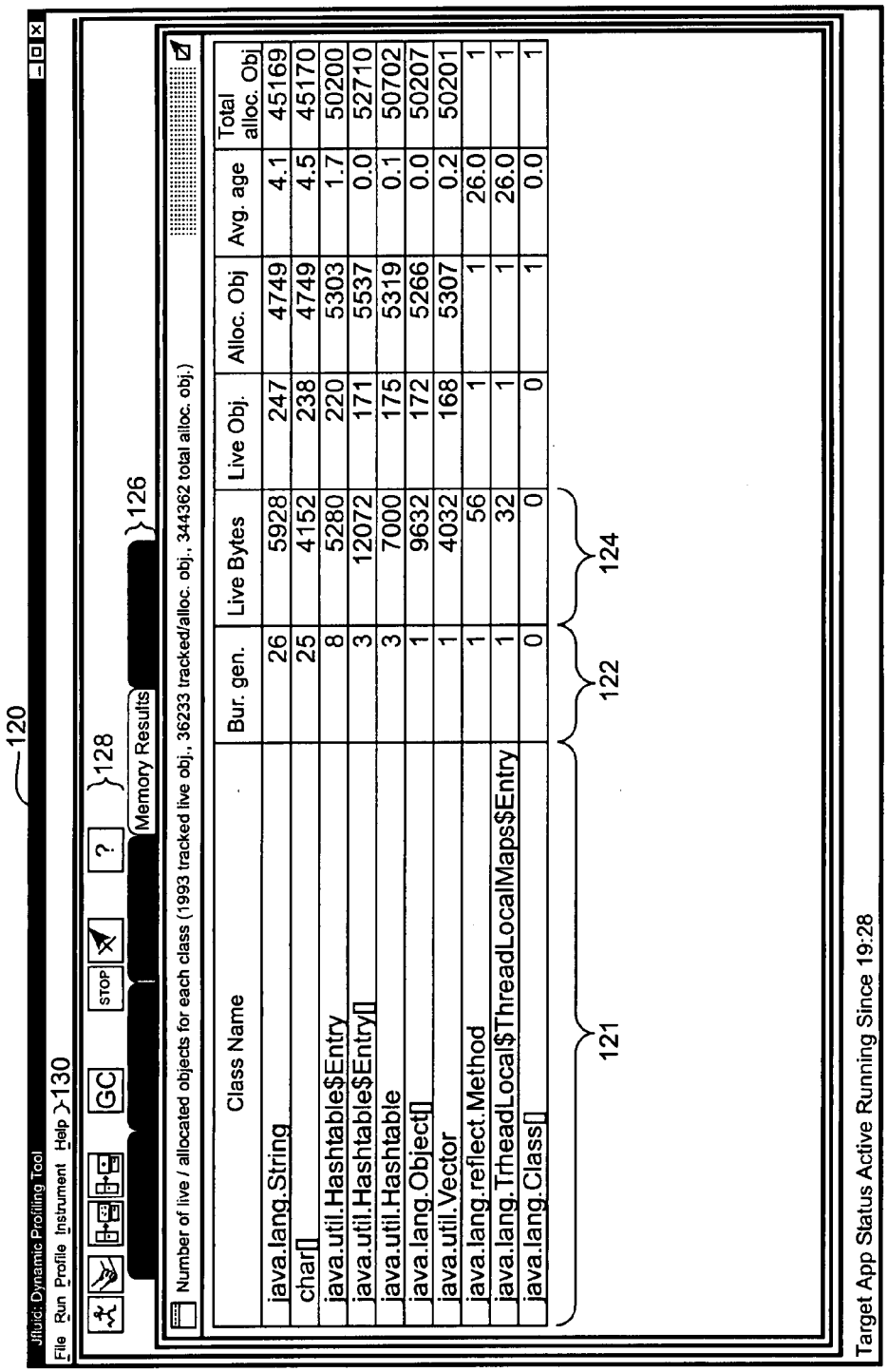
FIG. 5 is an exemplary graphical user interface illustrating the objects in the Java virtual machines memory, grouped by types and sorted by the surviving generations metrics in accordance with one embodiment of the invention.

FIG. 5 is an exemplary graphical user interface illustrating the objects in the Java virtual machine memory, grouped by types and sorted by the surviving generations number in accordance with one embodiment of the invention. Here, for the class String of column 121, the number of surviving generations in column 122 is much higher even though the memory occupied by these objects is relatively low, as illustrated in column 124. Because the number of surviving generations is much higher, it is an indication that some objects of class String are leaking. Rows 126, 128, and 130 represent toolbars having navigation tools/buttons that may be useful in conjunction with graphical user interface (GUI) 120 illustrated in FIG. 5.

Figure 6:
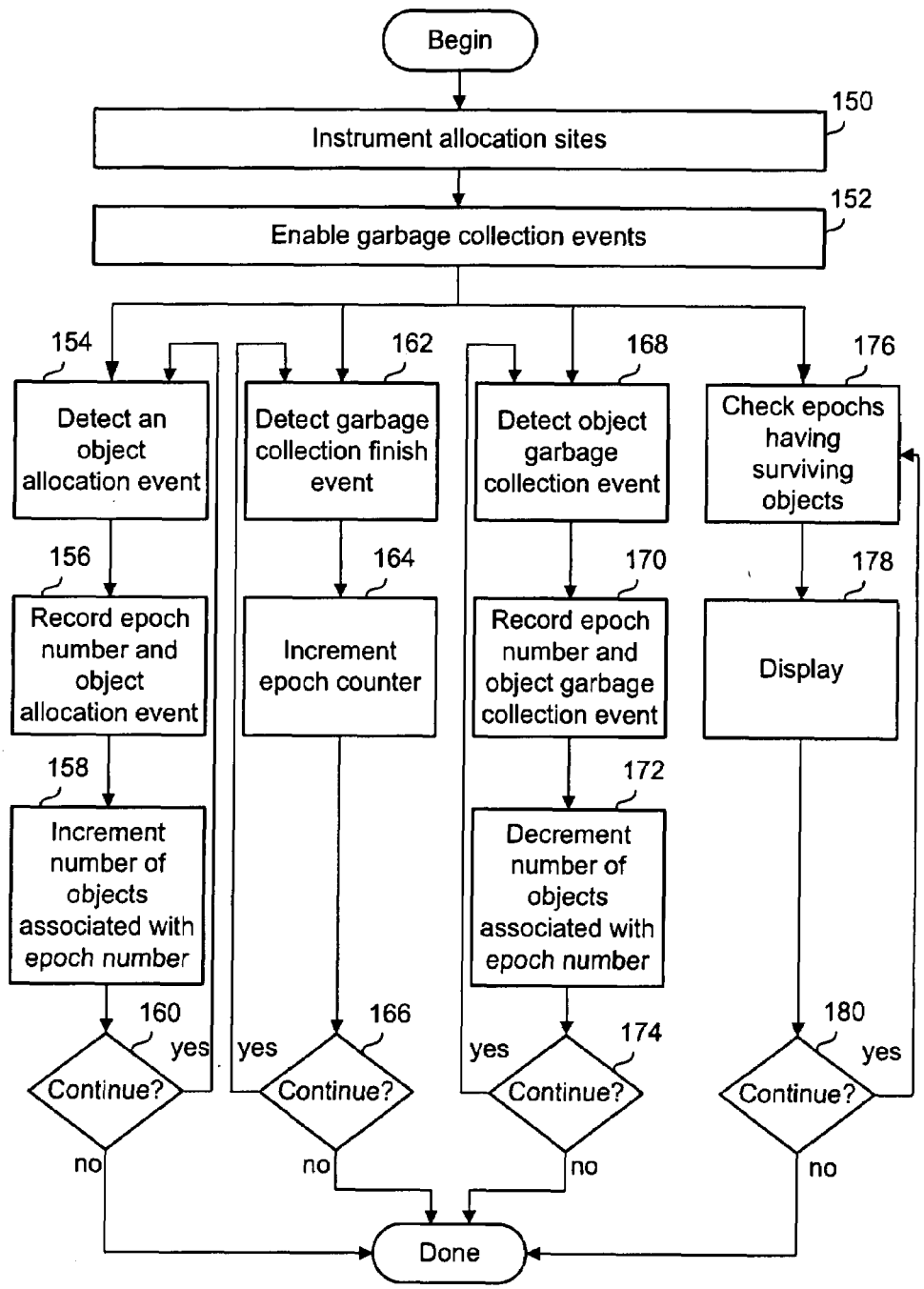
FIG. 6 is a flow chart diagram illustrating the method operations for identifying memory leaks in accordance with one embodiment of the invention.

FIG. 6 is a flow chart diagram illustrating the method operations for identifying memory leaks in accordance with one embodiment of the invention. The method initiates with operation 150 where allocation sites are instrumented. Here, code may be injected into the application in order to allow for the monitoring described herein. In particular, the code may be inserted in order to allow interception of object allocation, object reclamation and garbage collection, i.e., a garbage collection finish event. Here again, the embodiments discussed with reference to application Ser. No. 10/783,683, may be used here to inject code to track object allocations in order to collect, process, and present profile data. The method then advances to operation 152 where garbage collection events are enabled. It should be appreciated that the work of this method depends on the periodical "garbage collection finish" events generated by the virtual machine (or, generally, a runtime system), since for any object being kept track of, the number of "garbage collection finish" events happening after the corresponding object's creation determines the objects age.

The method of FIG. 6 then breaks off into four branches where the four branches may be executed in parallel, e.g., four concurrent threads may be executing each branch. It should be apparent to one skilled in the art, that the code representing one or more of the branches (for example, the one that registers object allocation events) may be executed on behalf of the threads of the user application, or the code may be executed by a thread specially set up by the profiling tool for the corresponding task. In the first branch, operation 154 detects an object allocation event. It should be appreciated that object allocation events may be detected as discussed in application Ser. No. 10/783,683. Then in operation 156 the epoch number and object allocation event are recorded. Thus, Tables 102 and 104 are being built as described above in this branch. In operation 158, the number of objects associated with the epoch number is incremented as described with reference to the Tables of FIGS. 2A through 3B. In decision operation 160 it is determined whether or not to continue. One skilled in the art will appreciate that the explicit check for continuation may or may not be present in the real implementation; such a check can be effectively replaced with, for example, an operation to terminate the corresponding thread of execution by force. If it is desired to continue the method returns to operation 154 and repeats as described above. If it is determined not to continue, the branch terminates.

In the second branch, in operation 162 a garbage collection finish event is detected. After detecting the garbage collection finish event, the epoch counter is incremented in operation 164. For example, another epoch line may be added to the epoch/number of surviving objects table discussed above, or an appropriate global counter may be incremented. Then in operation 166 it is determined whether or not to continue. If it is desired to continue the method returns to operation 162 and repeats as described above. If it is not desired to continue the branch terminates. In the third branch an object garbage collection event is detected. In one embodiment, reclamation of an object occurs here. The method then advances to operation 170 where the epoch number and object garbage collection event are recorded. Then, in operation 172 the number of objects associated with the epoch number is decremented due to the reclamation of the object. Thus, the Tables described above in FIGS. 2A-3B may be compacted here. In decision operation 174 if it is desired to continue, the method returns to operation 168 and repeats as above, while if it is not desired to continue the branch terminates.

In the fourth branch, in operation 176 the number of epochs having surviving objects is checked. This number may then be displayed in a graphical user interface in order to alert the user as to a possible memory leak. One exemplary embodiment of the graphical user interface includes FIG. 5. The method then advances to operation 180 where it is determined whether or not to continue. If it is determined to continue, the method returns to operation 176, while if it is not determined to continue, the branch terminates. One skilled in the art will appreciate that a certain number of time periods, i.e., epochs, may have to occur prior to concluding that a memory leak is occurring. That is, the data structures referred to above are built to a certain point in order to have a suitable confidence level to conclude that a memory leak is present.

In order to keep track of object allocations and reclamations in the Java programming language/platform, it is possible to use the following mechanism in one embodiment of the invention. All object allocation sites are instrumented, such that immediately after an object is allocated, a method referred to as trackObjectAllocation (Ojbect obj), is called. This method reads the current epoch number, the stack trace for the call, and eventually associates an object with all this information. In one embodiment, for the profiling system JFLUID (of the assignee), this is done by creating a unique object ID as a combination of the object's class id, epoch number, and the serial number of the object itself. This ID, along with the stack trace, is sent to the JFLUID client tool, that maintains the call stacks, "epoch/number of surviving objects" tables, and presents the final results to the user.

The trackObjectAllocation( ) method also creates a weak reference (an instance of the java.lang.WeakReference class) for obj, and puts a "WeakReference (obj)-ObjectID (obj)" pair into the special hash table that it maintains. Additionally, the above weak reference is associated with a single reference queue (an instance of java.lang.ref.ReferenceQueue class), which is also maintained. This mechanism allows for a notification when obj gets reclaimed. To get a notification, a separate thread is run in parallel with the main program, that keeps querying the reference queue for discarded objects using the ReferenceQueue.remove( ) method. Once this method returns with a WeakReference instance, the corresponding object obj is about to be garbage collected. The hash table is accessed to get the unique object ID for obj, and remove WeakReference (obj) from the table. Finally, the objectID (obj) is sent to the JFLUID client tool, that updates the corresponding "epoch/number of objects" table accordingly.

Ultimately, the JFLUID tool allows the user to request information about the number of live objects for each type, their average age (expressed in survived epochs), and the maximum number of surviving generations. Information can be sorted by each of these numbers. If the user suspects that the program has a memory leak, the user can choose sorting types by the maximum number of surviving generations, and then check periodically if this value is relatively large and keeps growing for some type. If that is the case, the user can further determine which combination of allocation site/call stack results in objects with the largest number of surviving generations. It should be appreciated that knowing the leaking class and this location may be a significant help in identifying the root cause of the memory leak.

To enhance the embodiments described above to aid the user in understanding the reason of why certain objects are leaking, discussed below are embodiments that provide a history of object's life that the user can further analyze. The proposed technique is described in the context of the Java programming language and platform. However, its general principles should be applicable in whole or in part to other programming languages/runtime systems that implement the same principle of dynamic object allocation and automatic garbage collection. The embodiments below describe a tool that can essentially perform the controlled execution of the user's application, make the application generate data about this execution, and collect and present this data.

Initially, the tool identifies objects that are leaking, i.e. types (classes) and allocation sites for such objects. In one embodiment this is achieved using the technique described above with references to FIGS. 1-6 and as further described in application Ser. No. 10/893,069.

In one embodiment, all allocation sites identified as possible sources of leaking objects, should be instrumented, e.g.

Foo foo = new Foo( );
ToolLibrary.registerObjectAllocation (foo, 1);

In essence, the regsiterObjectAllocation( ) call registers creation of the object and the location in the program code where it happened. Note that registerObjectAllocation( ) and other instrumentation calls discussed below take two parameters. The first parameter is the (leaking) object itself. The second parameter may be referred to as a code location identifier. The code location identifier is used to identify a location in the source code where the instrumented action is performed. It should be appreciated that code location identifier may take many different forms—for example, it may be some combination of the source code file identifier and the source line number in that file, and so on.

Next, the tool instruments all or some locations in the program, where instances of the class in question can be "passed around". Locations where instances of the class may be "passed around" include locations in the code where:
1. References to the leaking objects can be assigned to variables and object/class fields;
2. Leaking objects can be passed as parameters to functions (called methods in many object-oriented languages); and
3. Leaking objects can be returned by functions (methods).

Such locations can, in the simplest form, be identified based entirely on the type information for leaking objects. In other words, if it has been determined that leaking objects belong to an imaginary class shown below:

class Foo extends Bar { . . . } then all locations where an instance of class Foo can be passed around, such as:

| | |
|---|---|
| a) Foo foo = x.getFoo ( ); | //method defined as "Foo getFoo( )" |
| b) doSmthWithFoo (foo); | //method defined as "doSmthWithFoo (Foo foo)" |
| c) Bar bar = (Bar) vector.get(i); | //A variable of type Bar can reference //an instance of Bar's subclass Foo |
| d) doSmthWithBar(bar); | //method defined as "doSmthWithBar (Bar bar)" |

-continued

```
                            //same consideration as in c) about
                            subtypes/supertypes
e) bar = foo;
``` should be instrumented. It should be appreciated that a) and e) above are representative of references to leaking objects assigned to variables and object/class fields, b) and d) are representative of leaking objects that can be passed as parameters to functions, and c) is representative of a leaking object that can be returned by a function.

The terms "Instrumentation" or "instrumented," as used herein, mean that calls to special functions (also referred to as methods) are inserted, or injected into the application code. These special functions are defined in a library, that provides an API callable from the target application. This library is logically a part of the tool, and is designed to collect and convey information between the target application and the tool. It should be appreciated that instrumentation can be done in many ways. In the simplest to explain form, for ease of illustration, the tool can process the source code of the application and transform it in the following way (same code examples as above are used):

```
Foo foo = x.getFoo (foo);
ToolLibrary.registerPassAround   // The second parameter of the
(foo, 1);                        // call is a code location identifier.
doSmthWithFoo (foo);
ToolLibrary.registerPassAround
(foo, 2);
Bar bar = (Bar) vector.get (I);
ToolLibrary.registerPassAround
(bar, 3);
doSmthWithBar (bar);
ToolLibrary.registerPassAround
(bar, 4);
bar = foo;
ToolLibrary.registerPassAround
(bar);
```

An equivalent of the above-described example can be performed by analyzing and transforming the compiled program representation, e.g. the binary code or the bytecode, as it is the case with Java. It should be appreciated that instrumentation can be done statically, at class load time, or dynamically at runtime, e.g., using code hotswapping.

Instrumentation calls presented above perform the following operations:

1. The registerObjectAllocation (Object obj, int loc) call registers an object that has just been allocated, if the type and allocation site of this object have been previously identified as a source of potentially leaking objects. For example, the object can be put into a data structure that allows for a quick check for the presence of the given object, such as a hash table, and further associates an integer id with each registered object. Special measures can be taken to prevent objects that are not really leaking (it is possible that not all objects allocated at the given site end up as leaking) from being held in memory indefinitely by just this data structure. For example, in the Java language, WeakReferences can be used instead of direct object references. The following pseudo code is one exemplary instance of the functionality achieved by the

```
registerObjectAllocation(Object obj, int loc) call:
void registerObjectAllocation (Object obj, int loc) {
    //Check if the object we are about to register is suspicious
    Type type = obj.getType ( );
    // Check if obj's type and allocation site
    // have been previously identified as producing leaking objects
    if (isLeakingObjTypeAndAllocationSite(type, loc)) {
        // Register this object in the table for such objects
        int id = leakingObjectsTable.put (obj);
    }
    dumpFile.println("Object allocated", id, loc);
}
```

The registerObjectAllocation method checks if the object is a potentially leaking one, and if so, registers the object and logs the fact that it has been allocated, for example by writing down a record with a meaning such as:

"Object with id 123 was allocated at code location 321"

2. The registerPassAround(Object obj, int loc) checks if the object that is passed to it is a potentially leaking one, i.e. the object is contained in the above data structure leakingObjectsTable. If yes, i.e., the object is contained in the data structure, this function logs the fact that the object has been passed around. In one embodiment, the log is maintained by writing down or creating a record with the meaning such as:

"Object with id 123 was passed around at code location 456"

"Object with id 567 was passed around at code location 999"

The following pseudo code is one exemplary instance of the functionality achieved by the registerPassAround-Code (Object obj, int loc)

```
void registerPassAroundCode(Object obj, int loc) {
    // Check if this object is a potentially leaking one, that is, it was
    // tagged as such at allocation time.
    int id = leakingObjectsTable.get(obj);
    if (id != 0) { // Object was registered as a potentially leaking one
        dumpFile.println("Object passed", id, loc);
    }
}
```

One skilled in the art will realize that the above code is given for purely illustrative purposes, and embodiments of this invention can be used in many different methods for registering potentially leaking objects, checking if the given object is registered as a potentially leaking one, and recording various events happening with the object. For example, some run time systems (in particular, some Java Virtual Machines) may provide an API for explicitly tagging objects. That is, a runtime environment itself may provide some space in each object, or associated with each object, where one or more "tags" for a given object may be stored. In that case, there will be no need to maintain the explicit "leakingObjectsTable" data structure. Also, logging of the information about object allocations and object pass around may be recorded in many different forms. For example, a log record may be optimized for space and time efficiency by replacing text such as "Object passed" with just a single byte (or a combination of a few bits) denoting the corresponding event. In addition, the logging data may be sent over the network instead of being written into a file, and so on.

What is eventually presented to the user is a list of objects that are likely leaking, which may be referred to as suspicious objects, as detected through the embodiments described above with reference to FIGS. 1-6, along with the corresponding "pass-around logs." These pass around logs, also referred to as an object lifetime log, may be text consisting of records such as:

Object #123 of type Foo

"Created in Class1.myMethod ( ), line 10"

"Assigned to local variable x in Class2.methodY ( ), line 125"

"Assigned to object field Bar.f in Class4.methodY( ), line 29"

"Assigned to static data field Class5.z in Class3.methodZ ( ), line 14"

In another embodiment this object lifetime log is interactive, e.g. double-clicking at a given line in the log will open an editor window positioned at the corresponding location in the source code, thereby enabling a user to easily gain access to the corresponding location in the source code.

In yet another embodiment, the user may not see any explicit log at all. Instead, by pressing a key repeatedly, the user will cause the editor to highlight the locations in the program where the given object was allocated and then passed around, in order of the corresponding events.

The log data can be further correlated, in an automated manner, with the result of a heap dump. For example, the user may click on the log line where a reference to the object is assigned to some other object's field and see what holds the latter in memory. Using the above data, the user can easily determine what actions in their applications caused the given objects to leak.

Figure 7:
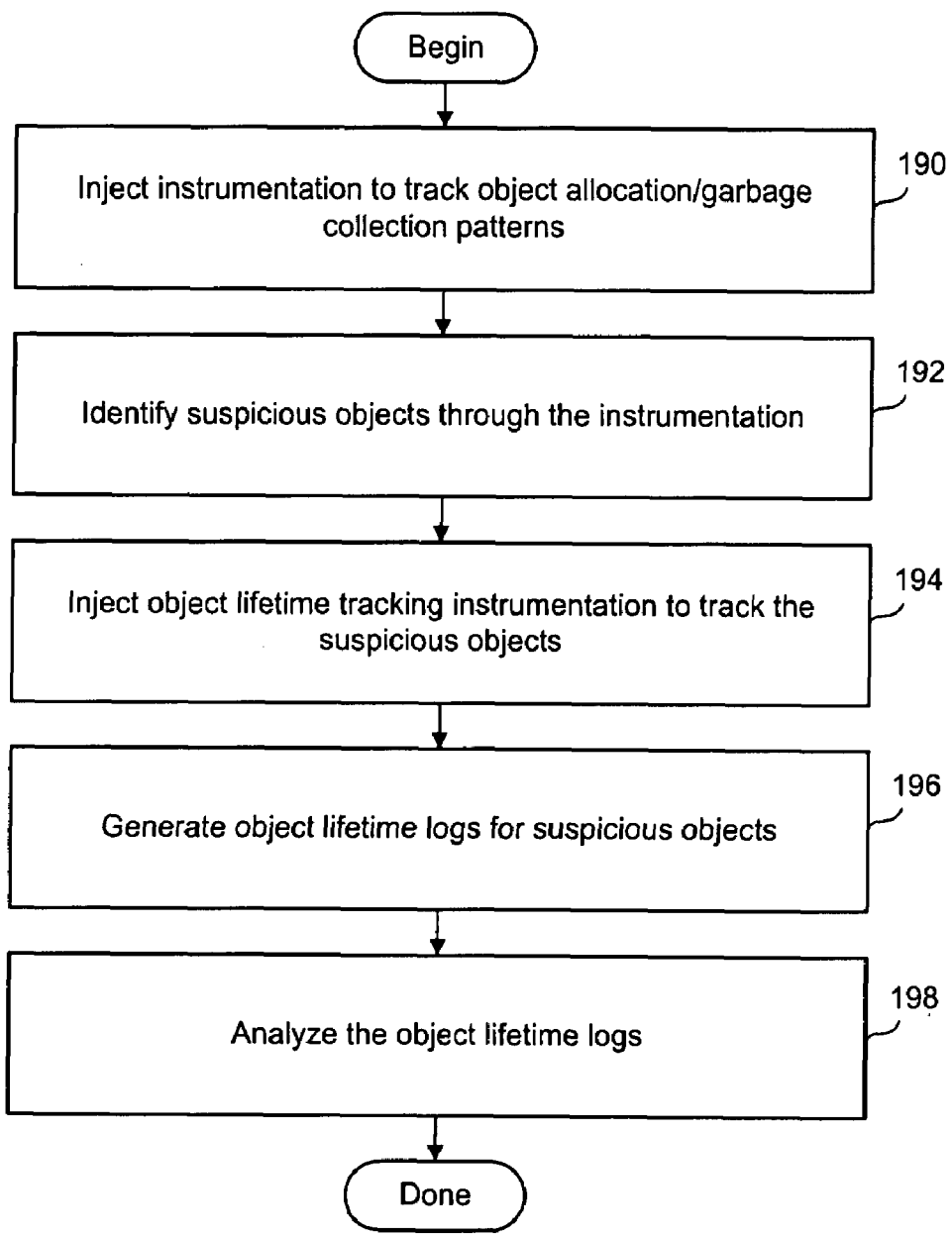
FIG. 7 is a flowchart diagram of the method operations for determining the cause for a leaking object in accordance with one embodiment of the invention.

FIG. 7 is a flowchart diagram of the method operations for determining the cause for a leaking object in accordance with one embodiment of the invention. The method initiates with operation 190 where instrumentation, e.g., a call to a special function, to track object allocation/garbage collection patterns is injected into the code of an application. This may be achieved through the embodiments described above with reference to FIGS. 1-6 and application Ser. No. 10/893, 069. The method then advances to operation 192 where potentially leaking objects are identified. Through the instrumentation, objects such as the objects associated with the larger number of surviving generations in column 122 of FIG. 5, may be identified as potentially leaking. The method of FIG. 7 then moves to operation 194 where instrumentation necessary for object lifetime tracking is injected to track the potentially leaking objects. Here the calls to the special functions perform the operations described above with reference to the registerObjectAllocation( ) call and the registerPassAroundCode( ) call. An object lifetime log is generated for each suspicious object in operation 196. One exemplary presentation of the object lifetime log is listed above. Of course, the object lifetime logs may be interactive as described above to enable a user to open an editor window to gain access to a corresponding location in the source code.

Figure 8:
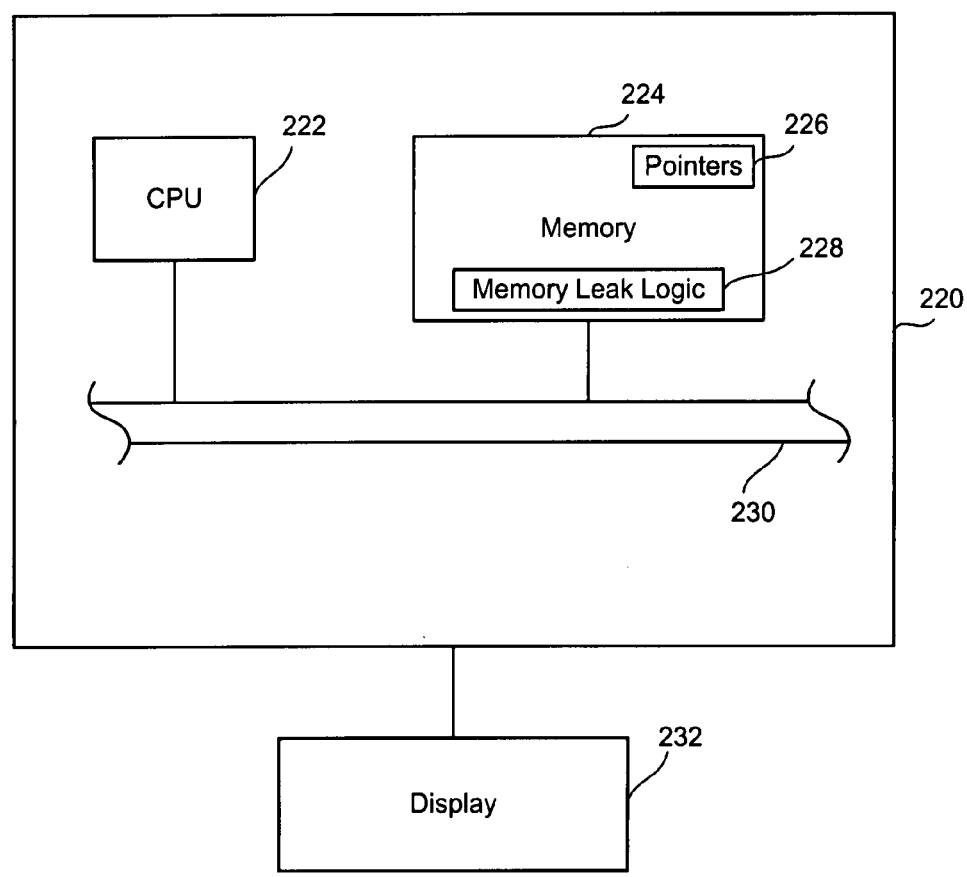
FIG. 8 is a simplified schematic diagram of a computing device having the ability to identify a cause of a memory leak in accordance with one embodiment of the invention.

FIG. 8 is a simplified schematic diagram of a computing device having the ability to identify a memory leak in accordance with one embodiment of the invention. Computing device 220 includes central processing unit 222, memory region 224, and bus 230 interconnecting the CPU and memory region. Memory region 224 includes pointer array 226 and memory leak logic 228. It should be appreciated that memory leak logic 228 is configured to track object allocation and determine a cause of a leaking object as described in reference to FIGS. 1 through 7 herein. That is, the functionality described above for identifying a memory leak and generating the object lifetime logs for suspicious or potentially leaking objects is incorporated into the memory leak logic. Thus, memory leak logic includes logic for detecting completion of the garbage collection event, logic for labeling each surviving generation for successive garbage collection events, logic for determining the existence of memory leaks based upon an increase in surviving generations after successive garbage collection events, logic for injecting object lifetime tracking instrumentation and logic to generate the object lifetime logs. As described above, the logic for generating the object lifetime logs includes the functionality to identify where in the application code the objects may be passed around.

In one embodiment, the logic mentioned above is computer code stored in memory that accomplishes the functionality described with reference to the flowcharts of FIGS. 6 and 7. Display 232 of FIG. 8 is included with the computing device and is used to display the GUIs described above. Of course, display 232 may be integrated into computing device 220. One skilled in the art will appreciate that each logic element described herein may a hardware component, software, or a combination of hardware and software.

In summary, the present invention provides a scheme for notifying the user about a memory leak in an object-oriented program and identifying the cause of the memory leak. The object oriented code is instrumented to identify potentially leaking objects. Such objects are then tracked through injected code. The injected code generates object lifetime logs so that a determination may be made as to whether the object is leaking and the corresponding cause for the leaking object. Through the object lifetime logs, a user may determine the cause of a leaking object. In one embodiment, the object lifetime log is interactive enabling a user to gain access to a corresponding location in the source code through an editor window.

With the above embodiments in mind, it should be understood that the invention may employ various computer-implemented operations involving data stored in computer systems. These operations include operations requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The above-described invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

The invention can also be embodied as computer readable code on a computer readable medium. The computer readable medium is any data storage device that can store data, which can be thereafter read by a computer system. A communications medium includes an electromagnetic carrier wave in which the computer code is embodied. Examples of the computer readable medium include hard drives, network attached storage (NAS), read-only memory, random-access memory, CD-ROMs, CD-Rs, CD-RWs, magnetic tapes, and other optical and non-optical data storage devices. The communications medium can also be distributed over a network coupled computer system so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

What is claimed is:

1. A method for identifying memory leak causes, comprising operations of:
    tracking a number of allocations of objects during a time period, the time period is in a multiple of an epoch wherein the epoch represents one garbage collection cycle;
    storing in a first table the number of allocations of the objects and a corresponding epoch sequence number in which the objects were allocated;
    storing in a second table a unique identifier of each of the objects and a corresponding epoch sequence number in which each of the objects were allocated;
    deleting a line in the second table that includes the unique identifier and the corresponding epoch sequence number when an object represented by the unique identifier is reclaimed during a garbage collection, and decrementing in the first table the number of allocations of the objects corresponding to the corresponding epoch sequence number that is deleted from the second table; and
    deleting a corresponding line in the first table when the number of allocations of the objects becomes zero.

2. The method of claim 1, further comprising,
    injecting object lifetime tracking instrumentation to track potentially leaking objects, the injecting including:
        identifying allocation sites as sources of potentially leaking objects; and
        identifying locations in an application code where an object is passed around.

3. The method of claim 2, further comprising:
    browsing the object lifetime logs; and
    correlating data in object lifetime logs with heap dumps.

4. The method of claim 2, wherein the method operation of identifying locations in an application code where a leaking object can be passed around include,
    identifying locations in the application code where references to the potentially leaking objects can be assigned to variables and object/class fields;
    identifying locations in the application code where potentially leaking objects can be passed as parameters to functions in the application code; and
    identifying locations in the application code where potentially leaking objects can be returned by functions.

5. The method of claim 2, further comprising:
    determining object pass around locations based on type information for potentially leaking objects.

6. The method of claim 2, further comprising:
    tagging potentially leaking objects.

7. The method of claim 6, wherein the method operation of tagging potentially leaking objects includes,
    entering the potentially leaking objects in a data structure.

8. The method of claim 6, wherein the method operation of tagging potentially leaking objects is accomplished by direct object tagging.

9. The method of claim 7, wherein the data structure is a hash table.

10. The method of claim 2, further comprising:
    intercepting an object passed around at one of the locations in the application code;
    checking whether the object has been tagged; and
    if the object has been tagged, the method includes recording the object pass around in a corresponding object lifetime log.

11. The method of claim 3, further comprising:
    generating an explicit object lifetime log for each leaking object.

12. The method of claim 11, wherein the method operation of generating an explicit object lifetime log for each leaking object includes,
    enabling access from each line in the explicit object lifetime log to a corresponding location in an application source code.

13. The method of claim 3, further comprising:
    providing a mechanism for browsing locations in an application code where a leaking object has been passed around, using just a single forward key.

14. A computer readable medium storing program instructions for identifying memory leak causes, comprising operations of:
    program instructions for tracking a number of allocations of objects during a time period, the time period is in a multiple of an epoch wherein the epoch represents one garbage collection cycle;
    program instructions for storing in a first table the number of allocations of the objects and a corresponding epoch sequence number in which the objects were allocated;
    program instructions for storing in a second table a unique identifier of each of the objects and a corresponding epoch sequence number in which each of the objects were allocated;
    program instructions for deleting a line in the second table that includes the unique identifier and the corresponding epoch sequence number when an object represented by the unique identifier is reclaimed during a garbage collection, and decrementing in the first table the number of allocations of the objects corresponding to the corresponding epoch sequence number that is deleted from the second table; and
    program instructions for deleting a corresponding line in the first table when the number of allocations of the objects becomes zero.

15. The computer readable medium of claim 14, further comprising,
    program instructions for injecting object lifetime tracking instrumentation to track potentially leaking objects, the program instructions of injecting including:
        program instructions for identifying allocation sites as sources of potentially leaking objects; and
        program instructions for identifying locations in an application code where an object is passed around.

16. The computer readable medium of claim 15, further comprising:
    program instructions for browsing object lifetime logs; and
    program instructions for correlating data in object lifetime logs with heap dumps.

17. The computer readable medium of claim 15, wherein the method operation of identifying locations in an application code where an object is passed around include,
    program instructions for identifying locations in the application code where references to the potentially leaking objects can be assigned to variables and object/class fields;

program instructions for identifying locations in the application code where potentially leaking objects can be passed as parameters to functions in the application code; and program instructions for identifying locations in the application code where potentially leaking objects can be returned by functions.

18. The computer readable medium of claim 15, further comprising:

program instructions for determining object pass around locations based on type information for potentially leaking objects.

19. A system for identifying memory leaks for an object-oriented application, comprising:

a microprocessor configured to execute the object-oriented application;

a memory in communication with the microprocessor; and memory leak identification logic configured to identify memory leaks, the memory leak identification logic including, logic for tracking a number of allocations of objects during a time period, the time period is in a multiple of an epoch wherein the epoch represents one garbage collection cycle;

logic for storing in a first table the number of allocations of the objects and a corresponding epoch sequence number in which the objects were allocated;

logic for storing in a second table a unique identifier of each of the objects and a corresponding epoch sequence number in which each of the objects were;

logic for deleting a line in the second table that includes the unique identifier and the corresponding epoch sequence number when an object represented by the unique identifier is reclaimed during a garbage collection, and decrementing in the first table the number of allocations of the objects corresponding to the corresponding epoch sequence number that is deleted from the second table; and logic for deleting a corresponding line in the first table when the number of allocations of the objects becomes zero.

20. The system of claim 19, further comprising, logic for injecting object lifetime tracking instrumentation to track potentially leaking objects, the logic for injecting including:

logic for identifying allocation sites as sources of potentially leaking objects; and logic for identifying locations in an application code where an object is passed around.

21. The system of claim 20, wherein the logic for identifying locations in an application code where an object is passed around includes, logic for identifying locations in the application code where references to the potentially leaking objects can be assigned to variables and object/class fields;

logic for identifying locations in the application code where potentially leaking objects can be passed as parameters to functions in the application code; and logic for identifying locations in the application code where potentially leaking objects can be returned by functions.

22. The system of claim 19, wherein each logic element is one or a combination of hardware and software.

* * * * *